United States Patent [19]

Watanabe et al.

[11] Patent Number: 4,890,227
[45] Date of Patent: Dec. 26, 1989

[54] AUTONOMOUS RESOURCE MANAGEMENT SYSTEM WITH RECORDED EVALUATIONS OF SYSTEM PERFORMANCE WITH SCHEDULER CONTROL INCLUDING KNOWLEDGE LEARNING FUNCTION

[75] Inventors: Toshinori Watanabe, Sagamihara; Koichi Haruna, Yokohama; Hiroshi Motoyama, Tokyo; Toru Nishigaki, Sagamihara; Koji Sasaki, Tokyo; Teruo Yakata, Yokohama; Yoshitaka Watanabe, Tokyo, all of Japan

[73] Assignee: Hitachi, Ltd., Tokyo, Japan

[21] Appl. No.: 89,919

[22] Filed: Aug. 25, 1987

Related U.S. Application Data

[63] Continuation of Ser. No. 631,803, Jul. 17, 1984, abandoned.

[30] Foreign Application Priority Data

Jul. 20, 1983 [JP] Japan ................................. 58-130820

[51] Int. Cl.$^4$ ...................... G06F 11/34; G06F 13/14
[52] U.S. Cl. .................................... 364/300; 364/200; 364/281.3; 364/281.8; 364/281.7
[58] Field of Search ... 364/200 MS File, 900 MS File, 364/300

[56] References Cited

U.S. PATENT DOCUMENTS

| | | | |
|---|---|---|---|
| 4,123,795 | 10/1978 | Dean et al. | 364/200 |
| 4,228,495 | 10/1980 | Benhard et al. | 364/200 |
| 4,432,051 | 2/1984 | Bogaert et al. | 364/200 |
| 4,541,043 | 9/1985 | Ballegeer et al. | 364/200 |
| 4,570,217 | 2/1986 | Allen | 364/188 |
| 4,601,008 | 7/1986 | Kato | 364/900 |

OTHER PUBLICATIONS

"A Policy-Driven Scheduler for a Time-Sharing System", by Bernstein et al., Communications of the ACM, vol. 14, No. 2, 2/1971, pp. 74–90.
"The Interaction of Multi-Programming Job Scheduling and CPU Scheduling", by Browne et al., AFIPS Conference Proceedings, 1972, pp. 13–21.
"Performance Evaluation–A Structured Approach", by Kimbleton, AFIPS Conference Proceedings 1972, vol. 40, pp. 411–416.
"Performance Modeling and Empirical Measurements in a System Designed for Batch and Time-Sharing Users", by Shemer et al., AFIPS, vol. 35, pp. 17–26.
AFIPS Conference Proceedings, vol. 37, pp. 89–128.
AFIPS Conference Proceedings, vol. 39, pp. 39–64.

Primary Examiner—Lawrence E. Anderson
Attorney, Agent, or Firm—Antonelli, Terry & Wands

[57] ABSTRACT

An autonomous resource management method for improving performance of a system in which plurality of process units compete for resources. Previously determined allocation policies are stored in memory along with system status data, control data and an evaluation of the effectiveness of the allocation policy. During the operation of the system, the status is detected and an allocation policy is retrieved from memory based on the detected status. The allocation policy is then modified and sent to the scheduler. The effect of modifying the allocation policy is detected and an evaluation of the modified allocation policy is stored in memory. Inferior allocation policies are deleted from memory.

28 Claims, 10 Drawing Sheets

| RESOURCE CLASS | $R_1$ | $R_2$ | --- | $R_n$ |
|---|---|---|---|---|
| $A_1$ | $\alpha_{11}$ | $\alpha_{12}$ | --- | $\alpha_{1n}$ |
| $A_2$ | $\alpha_{21}$ | $\alpha_{22}$ | --- | $\alpha_{2n}$ |
| --- | --- | --- | --- | --- |
| $A_m$ | $\alpha_{m1}$ | $\alpha_{m2}$ | --- | $\alpha_{mn}$ |
| TOTAL | 1.0 | 1.0 | --- | 1.0 |

FIG. 6

| COMPUTATION TIME / MEMORY CAPACITY | NOT MORE THAN 1 MIN. | 1 MIN. ~ 3 MIN. | NOT LESS THAN 3 MIN. |
|---|---|---|---|
| NOT MORE THAN 512 KB | $A_1$ | $A_2$ | $A_6$ |
| 512~1024 KB | $A_3$ | $A_4$ | $A_6$ |
| NOT LESS THAN 1024 KB | $A_5$ | $A_5$ | $A_7$ |

FIG. 5

| | | | 560 | 561 | 562 | 563 | 564 |
|---|---|---|---|---|---|---|---|
| PROCESS UNIT STATUS (510) | CLASS $A_1$ | QUANTITY | × | 50 | 200 | | |
| | | CHANGE | × | +1 | -5 | | |
| | $A_2$ | QUANTITY | × | 20 | 50 | | |
| | | CHANGE | × | -2 | +8 | | |
| | ⋮ | ⋮ | ⋮ | ⋮ | ⋮ | | |
| | $A_m$ | QUANTITY | × | 10 | 50 | | |
| | | CHANGE | × | +5 | -4 | | |
| COMPUTER STATUS (520) | $R_1$ | UTILIZATION FACTOR | × | 0.8 | 0.7 | | |
| | $R_2$ | UTILIZATION FACTOR | × | 0.9 | 0.5 | | |
| | $R_3$ | UTILIZATION FACTOR | × | 0.7 | 0.3 | | |
| | $R_4$ | UTILIZATION FACTOR | × | 0.3 | 0.1 | | |
| | $R_5$ | UTILIZATION FACTOR | × | 0.1 | 0.2 | | |
| | ⋮ | ⋮ | ⋮ | ⋮ | ⋮ | | |
| | $R_n$ | UTILIZATION FACTOR | × | 0.2 | 0.3 | | |
| EVALUATION POINT (530) | $J_1$ | | 90 | 50 | 40 | | |
| | $J_2$ | | 0 | 50 | 40 | | |
| EVALUATI- ON TERRITORY FUNC- TION PARAMETER (540) | $ir_1$ | | $ir_1^*$ | $ir_1'$ | $ir_1''$ | | |
| | $ir_2$ | | $ir_2^*$ | $ir_2'$ | $ir_2''$ | | |
| | $\alpha$ | | 0 | $\alpha'$ | $\alpha''$ | | |
| | $t$ | | 2 | 1 | 0 | | |
| CONTROL SIGNAL (550) | $W_1$ | WEIGHT | 1.0 | 0.7 | 0.8 | | |
| | ⋮ | ⋮ | ⋮ | ⋮ | ⋮ | | |
| | $W_k$ | WEIGHT | 0.0 | 0.1 | 0.05 | | |
| | $dp$ | OTHERS | $0.0\,d\ell_0$ | $0.1\,d\ell'$ | $0.05\,d\ell''$ | | |

AUTONOMOUS RESOURCE MANAGEMENT SYSTEM WITH RECORDED EVALUATIONS OF SYSTEM PERFORMANCE WITH SCHEDULER CONTROL INCLUDING KNOWLEDGE LEARNING FUNCTION

This application is a continuation of application Ser. No. 631,803, filed July 17, 1984, now abandoned.

BACKGROUND OF THE INVENTION

1. Field of the Invention

The present invention relates to a resource management system capable of autonomously achieving two objects through learning resource management or control knowledge, the enhancement of system throughput and enhancement of the response of a system, and more particularly to a resource management system which, by a learning process acquires an allocation scheduling function of process units to resources attain the above two objects in a computer system.

2. Description of the Prior Art

As a representative case for a resource management system, the present status of the operating system (OS) for a large scale computer system is discussed.

The purpose of a resource management system which is one of the cores of the operating system for a large scale computer system is to utilize resources of the computer system as effectively as possible to enhance the performance (i.e. throughput) and improve the response as measured from the user. To this end, many resource management systems have been proposed. (For example, A. J. Bernstein & J. C. Sharp: A Policy Driven Scheduler for a Time-Sharing System, Comm. ACM, Vol. 14, No. 2, pp. 74–78 (1971); H. W. Lynch & J. B. Page: The OS/VS2 Release 2 System Resources Manager IBM System Journal, Vol. 13, No. 4, pp. 274–291 (1974).)

In those proposals, in order to achieve the above two objects, utilization factors of the resources and quantities of resource services provided to process units (program units which are called transactions in an on-line system, jobs in a batch processing system and commands in a TSS system) are periodically measured and resource allocation schedule controls are performed by schedulers in accordance with the degrees of deviation from preset target values or service functions.

In order to cause the system to perform resource allocation scheduling, it is necessary to preset various open parameters including parameters for specifying shapes of service functions.

Figure 1:
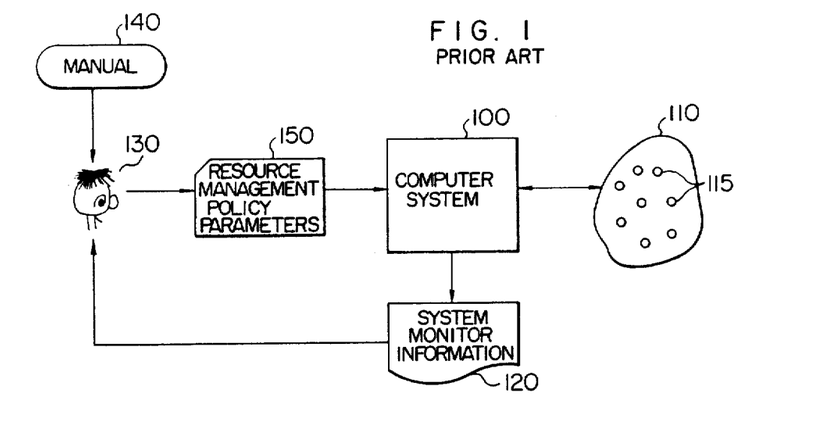
FIG. 1 is a block diagram of a prior art computer system resource management system.

FIG. 1 illustrates such situation. An aggregation 110 of process units 115 having various characteristics are inputted to a computer system 100. In order to achieve the above two objects under changing conditions, it is necessary for a manager (i.e. human operator) 130 using a computer system 100 to take in various monitor information 120 including the utilization status of the resources and optimize resource management policy parameters 150 such as the above-mentioned service function parameters, while referencing operating system manuals 140.

However, the characteristics of the process units to be processed are not stable (i.e. the quantities and the characteristics such as job mix vary with time) and it is uncertain whether and to what degree the above two objects are achieved by changing there adjustable parameters. Accordingly, it is very difficult to optimize these parameters. Even if it may be possible under stable environments, retry of parameter adjustments by a human operator is required each time the number of TSS terminals connected to the computer changes or real memory are enlarged, which are everyday affairs of widely used large scale computer systems.

SUMMARY OF THE INVENTION

It is an object of the present invention to provide a resource management system capable of autonomously adapting itself to characteristics of process units to be processed and changes in a computer system architecture.

It is other object of the present invention to provide a resource management system which can automatically determine the distribution of a resource utilization ratio of process units in an optimum manner depending on the system status.

In accordance with the present invention, there is provided an autonomous resource management system for a system having a plurality of process units competing for resources in the system. This invention comprises:

a step for forming a knowledge base containing, in the form of codes, information on an allocation policy of the system resources or the process units to the system resources and information on the performance of the system under the allocation policy;

a step for recalling an appropriate code from the knowledge base in accordance with the status of the system or the process units;

a step for modifying the allocation policy of the system resources described in the recalled code;

a step for measuring a result when the resources are allocated in accordances with the modified policy, or a similar result;

a step for evaluating the operation of the system under the modified allocation policy;

a step for recording a code including the evaluation result in the knowledge base; and a step for eliminating inferiorities in the preexisting codes and substituting the codes containing the modified allocation policy and the operation evaluation result when the latter codes are recorded in the knowledge base.

3

DESCRIPTION OF THE PREFERRED EMBODIMENTS

An embodiment of a computer system which is a typical case for the system to which the present invention is applied is now explained with reference to FIG. 2.

Figure 2:
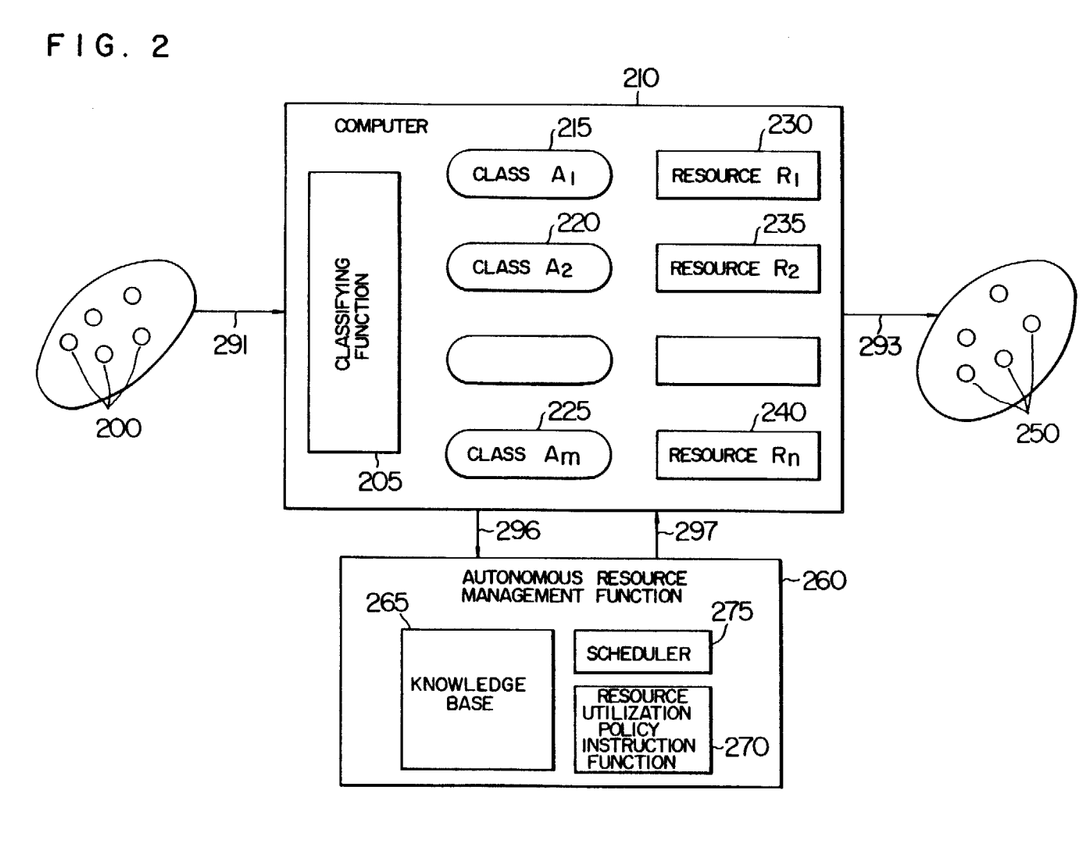
FIG. 2 is a functional configuration of an autonomous resource management system of the present invention.

FIG. 2 shows a functional configuration of an autonomous resource management system for a computer system in accordance with the present invention.

Numeral 200 denotes unprocessed process units inputted to a computer 210, and numeral 250 denotes processed process units. A classifying function 205 classifies the process units 200 into several classes. In one method, the process units are classified based on there processing times and memory requirements preassigned to each process unit. In another method, process units are actually executed and their characteristics such as memory usage etc. are measured.

The classified process units are queued in buffers (storage spaces) 215-225 provided one for each class.

Numerals 230-240 denote resources in the computer, such as real memories, a CPU, input/output channels, aggregate resources, and external storage devices.

The process units in the queues 215-225 compete for the resources 230-240. It is a role of the autonomous resource management system 260 to coordinate the competition, which system comprises a knowledge base 265, a low level scheduler 275 and a resource utilization policy instruction function 270. Stored in the knowledge base is resource management experience information compose of an index J of the operation performance of the computer system for a detected status Y of the computer or the process units and a resource utilization policy U, in the form of codes. The resource utilization policy instruction function 270 recalls an appropriate one of the codes in accordance with a detected status Ŷ currently monitored and autonomously modifies the policy U described thereon into a policy Û. The scheduler 275 resolves the competition in the computer 210 based on the policy Û. At each scheduling time and for each resource, one of the classes (215-225) of the process units competing for the use of the resources 230-240 is selected by the scheduler 275. The function 270 adopts the policy Û for a predetermined period and evaluates the operation performance of the computer during that period to prepare an evaluation J, and stores codes containing Ŷ, Ĵ, Û in the knowledge base 265. The number of codes which can be stored in the knowledge base 265 is limited. If there is a vacant space, the new code is stored as it is, but if there is no vacant space,

4 an inferior code in the knowledge base 265 is eliminated and the new code is stored in place of it.

In this manner, the codes in the knowledge base 265 are gradually updated so that effective resource utilization policies are automatically accumulated for a set of system status data in the knowledge base 265.

Numerals 291 and 293 denote the flows of the process units, and numerals 296 and 297 denote information. The information 296 represents a detected system status in the computer such as resource utilization and the queue lengths of the process units of each class. The information 297 represents a resource allocation instruction by the scheduler 275.

Figure 3:
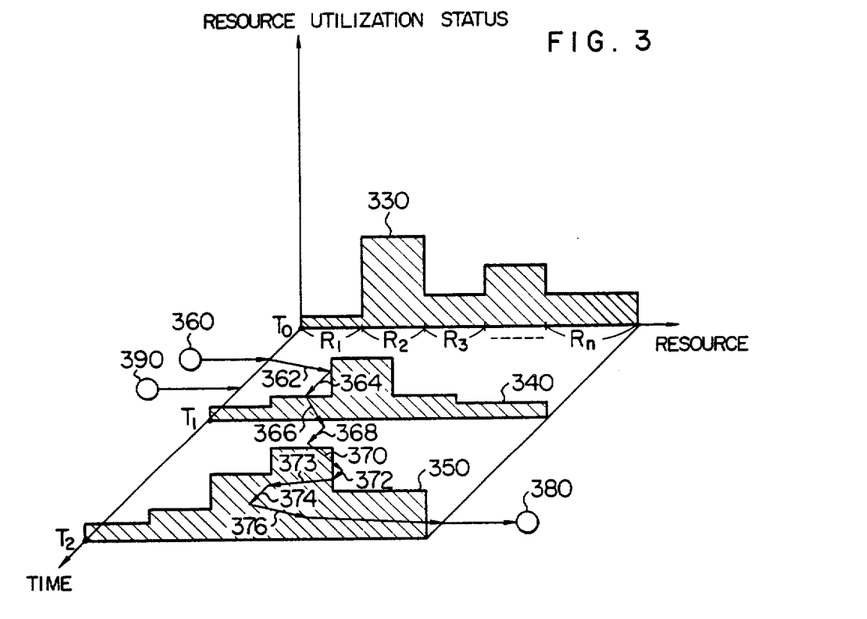
FIG. 3 illustrates a situation which occurs in the computer system to which the present invention is applied.

FIG. 3 diagramatically shows a situation which occurrs in the computer 210. It shows a graphic representation comprising a time axis, an axis of resources $R_1-R_n$ and axis of a resource utilization (for example, resource utilization factor per unit time). The resource utilization profile 330, 340 and 350 for the resources at times $T_0$, $T_1$ and $T_2$ are shown.

The process unit 360 inputted to the computer at a certain time is processed in the computer, and after the processing, it is outputted as shown by 380. Numeral 362 shows that the resource $R_1$ was utilized for a certain period. Numeral 364 indicates a status waiting to use $R_2$, numeral 366 indicates a use of $R_2$, numeral 368 indicates a status waiting to use $R_3$, numeral 370 indicates a use of $R_3$, numeral 372 indicates a status waiting to use $R_3$, numeral 373 indicates a use of $R_3$, numeral 374 indicates a status waiting to use $R_3$ and numeral 376 indicates a use of $R_3$, numeral 390 denotes another process unit.

The purposes of the resource management for the computer system are to enhance the performance, i.e. throughput, and to improve the response. The former is achieved by improving the utilization factors of the resources $R_1, R_2, \ldots R_n$, that is, increasing the areas of the profiles 330, 340 and 350 (hatched areas) for the respective resources as much as possible. The response requirement is achieved by reducing the expansion rate distribution parameter such as an average or a dispersion which indicates an extent of an expansion of a sum of waiting times (364, 368, 372, 374) and a net time (362, 366, 370, 373, 376) of process units (360, 390), divided by the net time.

Let us consider a period from a time $T_0$ to a time $T_2$. When the period is appropriately selected, the resource utilization factors of $R_1-R_n$ in this period and the expansion rate distribution parameters of the process units are roughly determined by the status of the computer (for example, the utilization factors of the resources) near the time $T_0$, the status of the process units (for example, the quantities of the process units in 215-225 of FIG. 2 and the tendency of increase or decrease) and the resource utilization policies adopted during the period of times $T_0$ to $T_2$.

In the present invention, the unknown relationship among that data is learned and reused by the resource manager 260 to enhance overall system performance.

Figure 4:
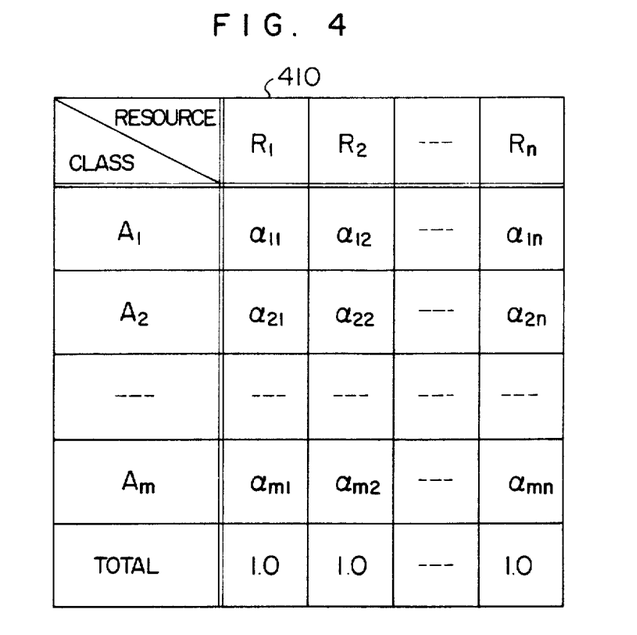
FIG. 4 is a resource utilization policy matrix in accordance with the present invention.

FIG. 4 shows an example of an instruction prepared by the resource utilization policy instruction function (270 in FIG. 2). In the present example, the instruction is given by matrix elements $a_{ij}$ ($i=1-m$, $j=1-n$), where a summation of $a_{ij}$ of each resource is equal to 1.0

$$\left( \sum_{j=1}^{m} a_{ij} = 1.0 \text{ for all } j\text{'s} \right).$$

For example, the first column (410) instructs that the ratios of the allocation of the resource $R_1$ to the classes $A_1, A_2, \ldots A_m$ must be $a_{11}, a_{21}, \ldots a_{m1}$.

The scheduler 275 of FIG. 2 allocates the process units in 215–225 of FIG. 2 to the resources 230–240 in such a manner that the above instruction is followed as much as possible. A specific manner will be described later.

Figure 5:
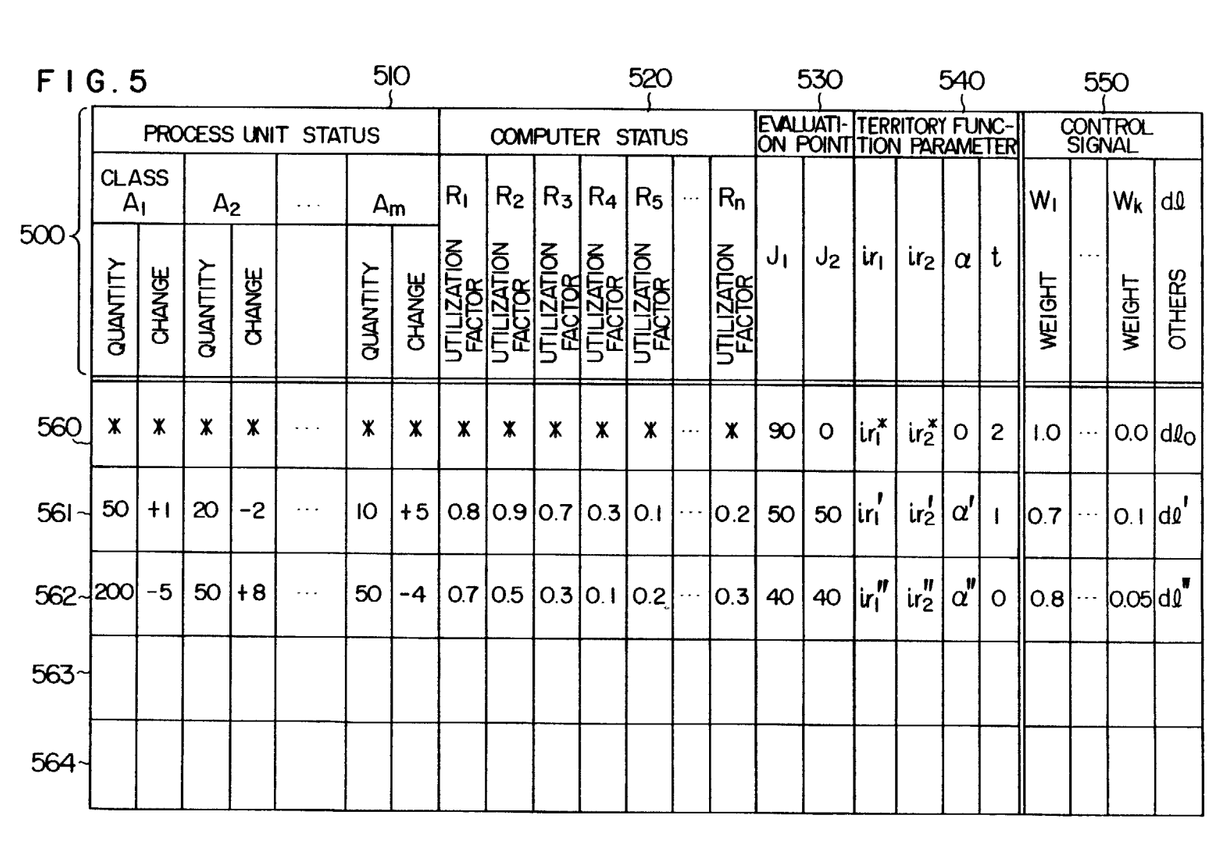
FIG. 5 is a content of a knowledge base in accordance with the present invention.

FIG. 5 shows an example of the knowledge base 265 of FIG. 2.

Numeral 500 denotes headings for explaining the contents of the items of the codes 560–562.

The codes include the following contents.

Process Unit Status (510)

It contains the number of process units in 215–225 of FIG. 2 and measured tendency of increase or decrease thereof. Since the movement of the object includes a high frequency variation, a high frequency component is eliminated by a moving average method.

A specific example will be explained later.

It is a role of 205 in FIG. 2 to classify the process units into classes $A_1, A_2, \ldots A_m$. In one classification method, information on the characteristics of the process units are prespecified by the computer user and the information is used in the classification. In another method, the process units are executed for a certain period of time when the process characters are monitored.

Figure 6:
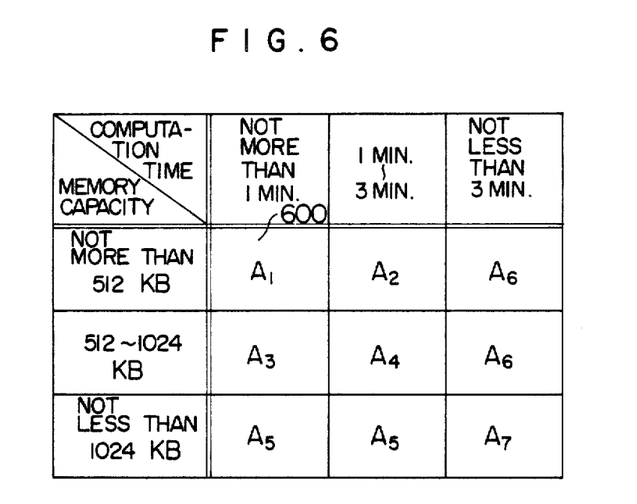
FIG. 6 illustrates classification of process units in accordance with the present invention.

FIG. 6 shows an example of the former method. For example, if the process unit requires a memory capacity of 512 KB or less and a computation time of one minute or less, the class $A_1$ is assigned to the process unit by the user.

In the latter method, the class $A_1$ 215 of FIG. 2 is reserved for unclassified process units and the elements in the class $A_1$ are imparted with a higher priority than the elements of other classes for the use of the resorces $R_1$–$R_n$ (only for a predetermined short i.e. time slices) so that the process unit in the class $A_1$ is classified into one of the classes $A_2$–$A_m$ depending on the information gathered in the execution.

Computer Status (520) in the Code of FIG. 5

It contains utilization factors of the computer resources 230–240 of FIG. 2. $R_1$ corresponds to a CPU, $R_2$ corresponds to a real memory, $R_3$ corresponds to a channel, $R_4$ corresponds to a disk and $R_5$–$R_n$ correspond to aggregated resources to be described later.

Figure 7:
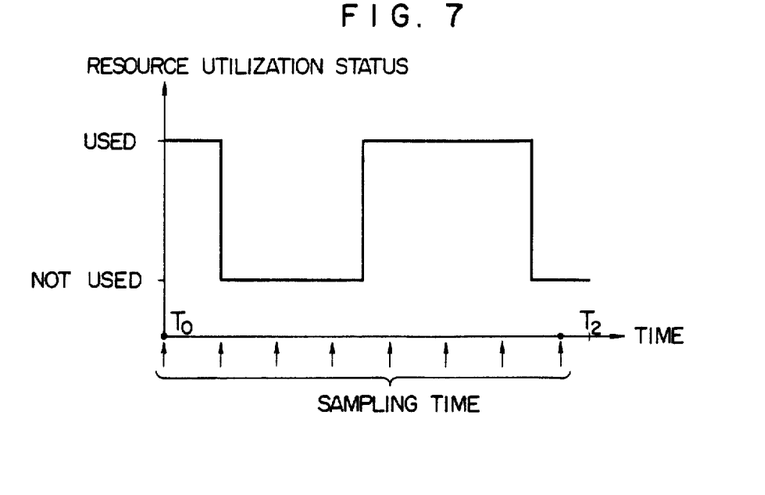
FIG. 7 illustrates a definition of a resource utilization factor in accordance with the present invention.

A definition of the utilization factor is explained with reference to FIG. 7. Any resource in the computer time is either used or unused at any specified time. The utilization factor of the resource during a period from time $T_0$ to time $T_2$ indicates a ratio of the use time of the resource during the time interval to the total time $T_2$–$T_0$. This is a fundamental definition and many other variations which use the moving average method or the like to estimate the ratio may be used.

Figure 8:
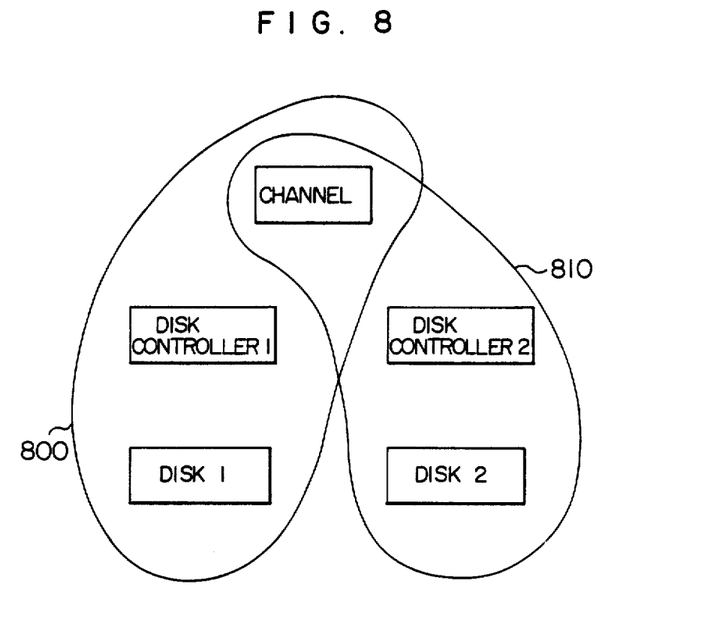
FIG. 8 illustrates a concept of aggregate resource in accordance with the present invention.

FIG. 8 illustrates the aggregated resource. Some process units cannot be executed unless occupying some aggregation of resources. The aggregated resource means a new resource (800, 810) which is the aggregation of such resources. The aggregated resource utilization factor is defined by a rate of use of any one of the resources in the aggregated resource. In other words, the aggregated resource utilization factor is represented by 1.0-g where g is a rate of non-use of all resources in the aggregate resource.

Evaluation Point (530) in the Code of FIG. 5

It contains an evaluation prepared by measuring the operation performance of the computer system during the period from $T_0$ to $T_2$ (FIG. 3). The evaluation includes two values, $J_1$ and $J_2$, although normally $J_1 = J_2$. A detail thereof will be explained later.

Figure 9:
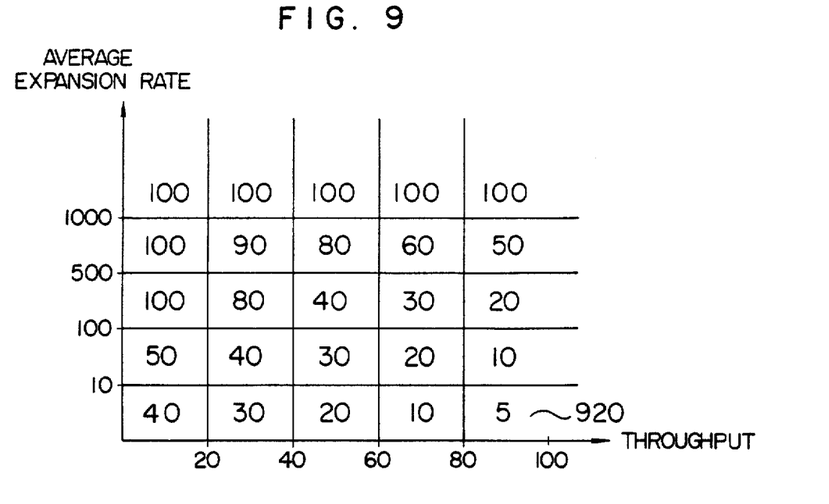
FIG. 9 illustrates a performance evaluation method for a control effect in accordance with the present invention.

An example of an evaluation method is illustrated in FIG. 9. In the present example, the evaluation point $J_1$ ($=J_2$) is determined as a function of the throughput of the computer system during the period $T_0$-$T_2$ and the expansion rate of the process unit process time. When the throughput is not less than 80 and the expansion rate is not more than 10, the evaluation point is 5 as shown by 920. In the present example, the better the performance is, the smaller is the evaluation point.

Figure 10:
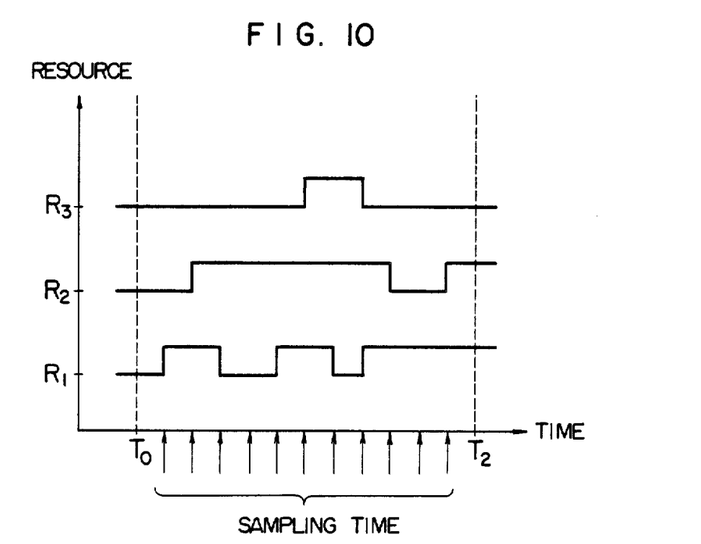
FIG. 10 illustrates a definition of a throughput in accordance with the present invention.

A calculation method for the throughput is shown in FIG. 10. The use and non-use of the resources $R_1, R_2, R_3, \ldots R_n$ at the sampling points in the period $T_0$-$T_2$ are checked and a utilization factor $v(R_j)$ (in % representation) of the resources during this period is calculated. The throughput is defined by $$\sum_{j=1}^{n} \beta_j \cdot v(R_j)$$

where $\beta_j$ is a predetermined positive constant.

Figure 11:
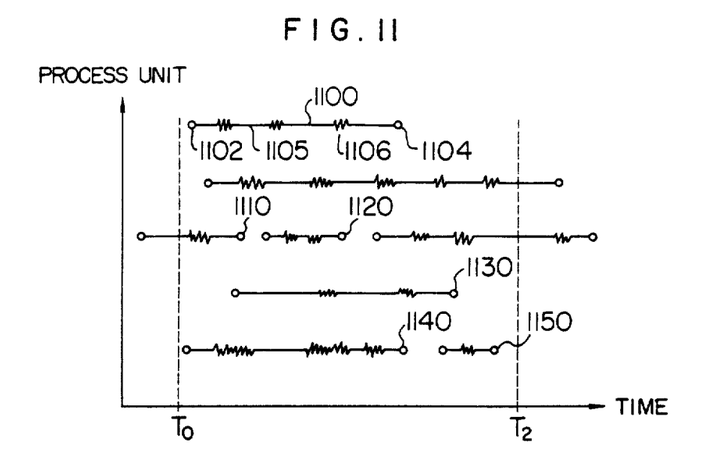
FIG. 11 illustrates a definition of process unit expansion rate in accordance with the present invention.

Expansion rate of a process unit is the ratio of its total processing time to its net processing time. The average expansion rate is the average of the expansion rates of the respective process units. FIG. 11 illustrates it. Numerals 1100 and 1110 show process histories of the process units. Numeral 1102 denotes a start point of the process of the process unit 1100 and numeral 1104 denotes an end point of the process. Solid lines such as 1105 indicate that the resources are being used, and zigzag lines indicate that the process is waiting for some resource. The average expansion rate during the period $T_0$-$T_2$ is an average (in % representation) of the expansion rates calculated for the respective process units (1100, 1110, 1120, 1130, 1140, 1150) completed during this period, that is, the average of ratios of the total processing times (solid lines and zigzag lines) to the net processing time (solid lines).

There are many other methods for evaluation. The average expansion rate has a disadvantage in that it lacks a stability which is a preferred prerequisite of an evaluation index because it varies depending on the number of process units being processed. In order to relieve the above disadvantage, an index indicating a deviation of the expansion rate of the process unit from the average expansion rate, such as a standard deviation of the expansion rate may be used in place of the average expansion rate. For more detailed evaluation, the average expansion rate axes of FIG. 9 may be drawn one for each of the classes $A_1$-$A_m$ of FIG. 4 to form FIG. 9 as multi-dimensional table.

Territory Functional Parameter (540) in the Code of FIG. 5

The resource utilization policy instruction function 270 of FIG. 2 reads and writes the codes (rules) from and into the knowledge base. Two territory functions $P_1 (\hat{Y}, Y, J_1, t, r_1, \alpha)$, $P_2 (Y, \hat{Y}, J_2, t, r_2, \alpha)$ are attached to each of these codes to allow reading and writing. The parameters $r_1$, $r_2$, $\alpha$, t are used by those functions. ($r_1$, $r_2$, $\alpha \geq 0$). Those functions are visualized in FIG. 12.

Figure 12:
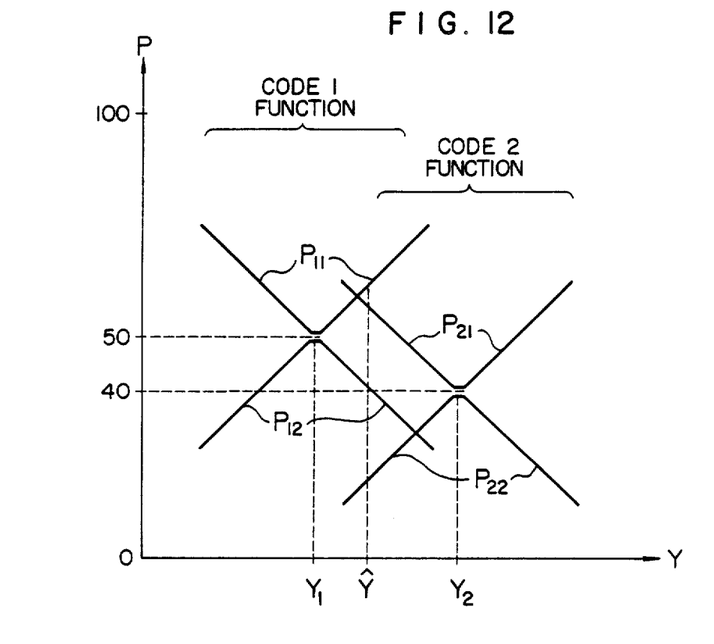
FIG. 12 illustrates territory functions in accordance with the present invention.

An ordinate P represents the function value and an abscissa Y represents vector space of a condition field of the code, that is, a space of vectors composed of the items 510 and 520 of FIG. 5. In this example, the Y in FIG. 12 shows a one-dimension space for the vector. Four functions in total are shown, two for each of the codes. Points $Y_1$ and $Y_2$ show the vector of the condition fields of the two codes. The functions of the code 1 are $P_{11}$ and $P_{12}$, and the functions of the code 2 are $P_{21}$ and $P_{22}$. By changing the parameters $r_1$, $r_2$, $\alpha$, t, the forms of these functions can be modified.

The functions $P_{11}$ and $P_{21}$ are used when the code is recalled from the knowledge base. Let us assume that only those two codes 1 and 2 exist in the knowledge base and a vector Y represents the detected status of the process units and the computer measured by the resource utilization policy instruction function 270 of FIG. 2 at some time point.

In the two codes, the function $P_{21}$ is minimum at point $\hat{Y}$. Accordingly, the code 2 is recalled for use. (Actually, a plurality of codes having small $P_1$ values are selected and one of them is randomly selected in order to prevent the repetitive selection of a code which is not highly effective but happened to derive a good resource management performance by chance.)

An operation for storing a used code which was recalled by the vector $\hat{Y}$ for use in the control, into the knowledge base is now explained. When there is an unused storage space (563, 564 in FIG. 5) in the knowledge base, it is stored therein. If there is no storage space, the code, the function $P_2$ of which is maximum at point $\hat{Y}$ (code 1 in FIG. 12) is eliminated and the used code is stored in place of it.

By using a function having a single minimum as the function $P_1$ and a function having a single maximum as the function $P_2$, a superior code having Y close to $\hat{Y}$ can be recalled and an inferior code having Y close to $\hat{Y}$ can be eliminated. In this manner, the knowledge base is refined each time it is used.

The functions $P_1$ and $P_2$ may be defined in various ways. One example is shown below.

$$P_1 (\hat{Y}, Y, J_1, t, r_1, \alpha) = J_{max} - \left\{ J_{max} - \frac{J_{max}}{1 + \left(\frac{J_{max}}{J_1} - 1\right)\exp(-\alpha t)} \right\} \exp\{-A(r_1, \hat{Y} - Y)\}$$

$$P_2 (\hat{Y}, Y, J_2, t, r_2, \alpha) = \left\{ \frac{J_{max}}{1 + \left(\frac{J_{max}}{J_2} - 1\right)\exp(-\alpha t)} \right\} \exp\{-A(r_2, \hat{Y} - Y)\}$$

where $J_{max}$ is a constant equal to or slightly smaller than a maximum value of the evaluation points $J_1$ and $J_2$ (for example, $J_{max} = 99$ may suffice in the case having 100 as the worst performance index in FIG. 9), and $A(r_3 x)$ is a function for calculating a distance (norm) of a vector X. Where $A(r, 0) = 0$, $r = (r_1, r_2)$ and $X = (x_1, x_2)$ $A(r, x) = r_1 |x_1| + r_2 |x_2|$, where $|x_1|$ is an absolute value of $x_1$ and r is a weighting factor for distance calculation.

The parameter t indicates the age of the code, which is incremented by one each time some code is stored in the knowledge base. The parameter $\alpha$ is a coefficient used to reflect t to the values of the functions $P_1$ and $P_2$. It governs the upward movement velocity of the functions $P_{11}$ and $P_{12}$ in FIG. 12. As a result, the aged codes with large t are more unlikely to be recalled and more likely eliminated. That is, they are gradually forgotten. The larger the $\alpha$ is, the higher is the forgetness rate.

At extremal point of function $P_1$ and $P_2$, function $P_1$ takes the value $J_1$ ($P_1 = J_1$) and $P_2 = J_2$ when the age $t = 0$, where $J_1$ and $J_2$ are the evaluation point 530 of FIG. 5. As $\hat{Y}$ goes away from Y, $P_1$ increases and $P_2$ decreases. As $t$ approaches an infinite, $P_1$ and $P_2$ approach $J_{max}$.

Control Signal (550) in the Code of FIG. 5

Figure 13:
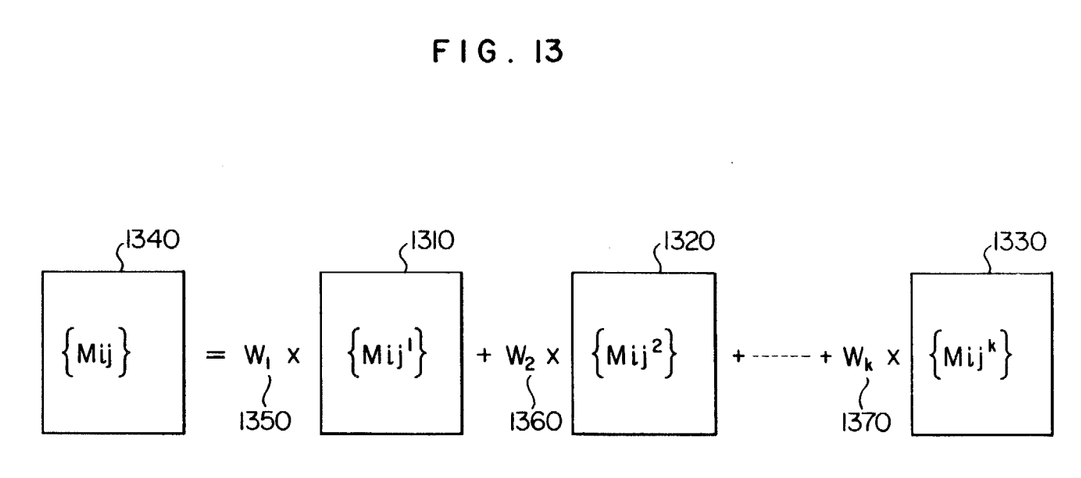
FIG. 13 illustrates a method for preparing the resource utilization policy matrix in accordance with the present invention.

It contains information on the resource utilization policy of the computer. The utilization policy may be given in various ways. One example thereof is shown in FIG. 13.

Numerals 1310–1340 denote matrices similar to the resource utilization policy matrix shown in FIG. 4. In the present example, typical policy matrices 1310, 1320, 1330 are predefined and the actually used matrix 1340 is generated as a linear sum of those matrices. The $w_1$-$w_k$ (1350–1370) are weighting factors.

By varying $w_1$-$w_k$, various resource utilization policies can be generated. They are indicated by the field 550 in FIG. 5. It is to be noted here that appropriate values for $w_1$-$w_k$ are not known and they should be learned through the operation of the computer system under varying environment.

Several parameters other than $w_1$-$w_k$ are also stored in the field 550. They are shown by d in FIG. 5. The d includes a parameter for indicating a time period (in seconds) during which the resource utilization policy instructions by the weighting factors $w_1$-$w_k$ are applied. Another parameter which is contained in d is a parameter to detect the status of the computer such as a smoothing constant used in the moving average method for calculating a resource utilization rate. When it is difficult to set those parameters, they may be learned in a similar manner as the weighting factors $w_1$-$w_k$.

Default Code (560) in the Knowledge Base of FIG. 5

Symbols * are marked to the vectors (510, 520) of the condition field. The symbol * is defined as a virtual number having zero distance from any real number. In the function $A(r_i, \hat{Y} - Y)$, if $\hat{Y} = (\hat{Y}_1, *)$ and $Y = (*, y_2)$, then $A = 0$. That is, the vector Y in the condition field under the default code has zero distance from any other vector $\hat{Y}$. $J_1 = 90$ (any value close to $J_{max}$ suffices), $J_2 = 0$ and $\alpha = 0$.

By putting those values to the definitions of the functions $P_1$ and $P_2$, it is seen that the $P_1$ and $P_2$ of the default code (560) do not depend on the age t for a given vector $\hat{Y}$, and $P_1 = 90$ and $P_2 = 0$. So, the present default code 560 is hard to be recalled from the knowledge base and hard to be eliminated but can be recalled from any detected status vector $\hat{Y}$. In other words, the default code can function as a substitution code when no other appropriate code is available.

As shown in the column 550 in the line 560 of FIG. 5, if $(w_1, w_2, \ldots, w_k) = (1.0, 0.0, \ldots, 0.0)$ are preset, the default code is recalled unless another appropriate code is available and once it is recalled, the resource management using only the resource utilization policy matrix 1310 of FIG. 13 is instructed.

Other Codes (561, 562) in the Knowledge Base of FIG. 5

They contain various information including the vectors (510, 520) of the condition field. These are accumulation of the resource management experience. The code 561 has the following meaning.

When the detected status of the process units is (50, +1, 20, −2, ..., 10, +5) and the detected status of the computer is (0.8, 0.9, 0.7, 0.3, 0.1, ..., 0.2) and the resource management is executed by using the control signal (0.7, ..., 0.1, d'), the perfomance evaluation points become $J_1 = J_2 = 50$. The territory function parameters of this code are $(r_1', r_2', \alpha', 1)$, where $r_1', r_2', \alpha'$ are constants although specific values thereof are not shown for brevity of explanation. Numeral 1 shows that the age of the code is one.

Figure 14:
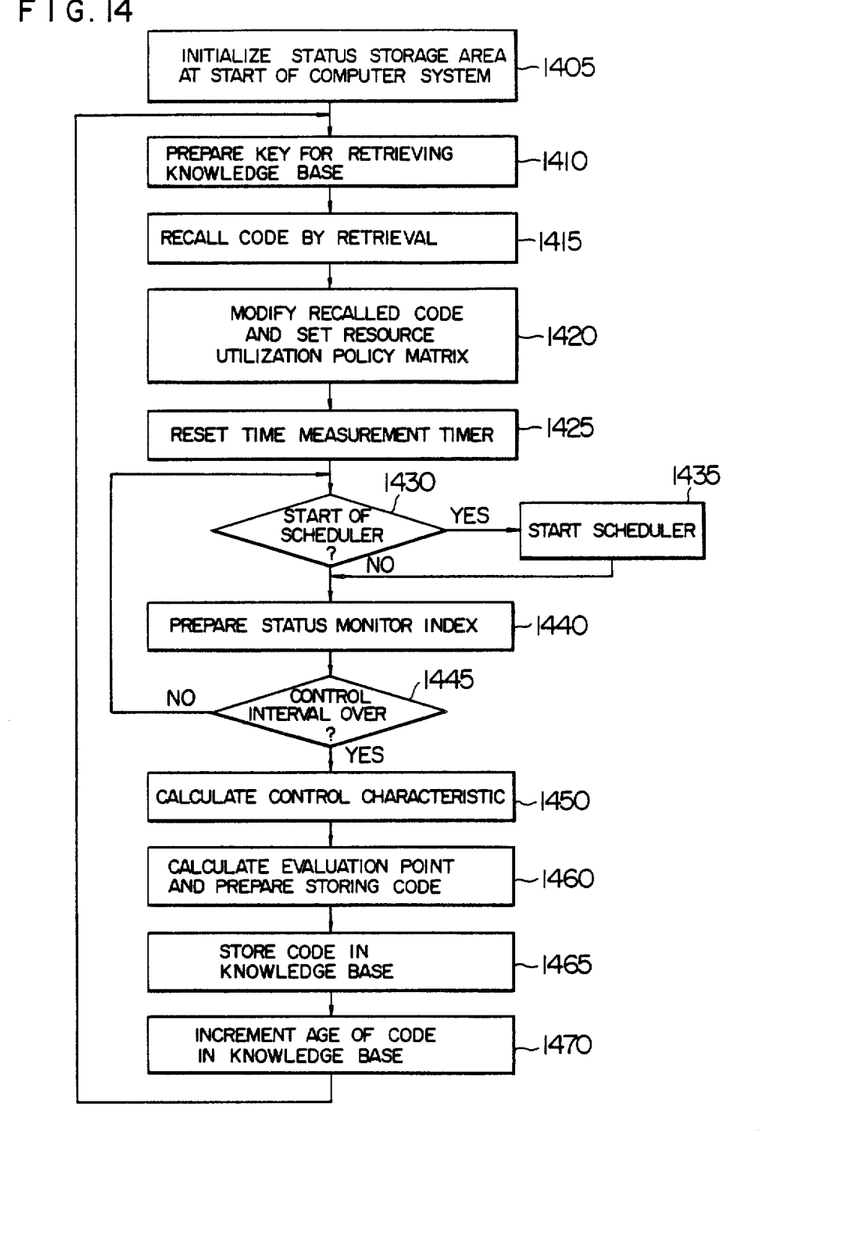
FIG. 14 is a flow chart for explaining an operation of a learning resource manager in accordance with the present invention.

FIG. 14 shows a flow chart for the operation of the resource utilization policy instruction function 270 of FIG. 2.

At the initialization of the computer system, the area which stores the detected status of the process units and the computer are initialized, for example, set to zero (1405). This area is called SA. The content of SA is identical to that of 510 and 520 in FIG. 5.

Then, the knowledge base retrieving key $\hat{Y}$ is prepared based on the content of the SA. Since SA is identical to 510 and 520 of FIG. 5, the content of the SA may be considered as $\hat{Y}$ (1410).

The knowledge base is retrieved by using the key $\hat{Y}$ to recall a code (1415). The code to be recalled is determined by first selecting a predetermined number of codes in the knowledge base having a smaller $P_1$ function value at key $\hat{Y}$, and second, randomly selecting one of those codes.

The recalled code is modified and the resource utilization policy matrix is established (1420). The weighting factors $w_1$-$w_k$ and other parameters in the control signal field (550 in FIG. 5) in the right side of the recalled code are modified by random numbers. For example, the weighting factors are modified in the following manner.

$$w_j(NEW) = w_j(OLD) + w \cdot \delta$$

where $w_j(NEW)$ is the weighting factor after the modification, $w_j(OLD)$ is the weighting factor before the modification, w is a predetermined constant and $\delta$ is a random number between −1 and 1.

The policy matrix (1340 in FIG. 13) is determined by using the $w_j(NEW)$ (j=1, 2, ..., k) in the method shown in FIG. 13.

The other parameters than the weighting factors, that is, the elements of d in 550 in FIG. 5 including the parameter (for example, smoothing constant $\rho$ when an exponential smoothing method is used) in the moving average method for monitoring, the control interval time T and the status of the computer, are also modified in appropriate methods. The modified values are shown by T(NEW) and $\rho$(NEW). In order to prevent unduely large or small values for those parameters, upper limits and lower limits are preset and if the values exceed those limits, they are set to the limits.

Next, the time measurement timer is reset to zero (1425).

Whether the low level scheduler is to be started or not is checked at the sampling period of the computer system to start the scheduler at each scheduler start time (1435). If the schedule period is 50 sampling period, the scheduler is started once in every 50 samplings. The operation of the scheduler will be explained with reference to FIG. 15. Then, the status monitor index is prepared and written into the area SA (1440). As an example of the status monitor index, the CPU utilization rate is considered and a method for calculating it is explained.

The status monitor is used for two reasons. One is to prepare the knowledge base retrieving key $\hat{Y}$ and the other is to calculate the throughput for calculating the performance evaluation points $J_1$ and $J_2$ to evaluate the resource utilization policy. The former watches the status of computer system and process units in a relatively short period while the latter watches the system performance in a relatively long period. Accordingly, the calculation methods of the monitor index which comply with the respective objects are required.

The monitor system for the CPU utilization rate which uses the moving average method, particularly the exponential smoothing method is explained. It uses the following method.

$$V_{CPU}(t) = \rho \cdot u(t) + (1-\rho) V_{CPU}(t-1)$$

where $V_{CPU}(t)$ is a moving average of the CPU utilization rate at a monitor time t, $V_{CPU}(t-1)$ is a moving average of the CPU utilization rate at an immediately previous monitor time, u(t) is a variable which is 1 if the CPU is being used at the monitor time t and 0 if the CPU is not used, and $\rho$ is a smoothing constant which is $\rho$(NEW) described above. In this method, by storing the $V_{CPU}$ (t=1) at the immediately previous monitor time in the area SA, the current value $V_{CPU}(t)$ can be readily determined. Accordingly, it is not necessary to store many u(t) over a past period.

The constant $\rho$ is between 0 and 1 as seen from the formula, the CPU utilization factor in the past period close to the time t is obtained by approximating $\rho$ to 1. When $\rho$ is approximated to 0, the CPU utilization factor for a long period in the far past is obtained.

Thus, two moving averages of the CPU utilization factors are calculated by using the smoothing constants $\rho_1$ and $\rho_2$ which are for example $0.01 \leq \rho_1 \leq 0.02$ and $0.1 \leq \rho_2 \leq 0.2$, and the former is used to calculate the throughput for preparing the evaluation point and the latter is used to calculate the knowledge base retrieving key $\hat{Y}$.

The constants $\rho_1$ and $\rho_2$ are stored in memory as part of the parameter d 550 of FIG. 5, and they are modified to $\rho_1$(NEW) and $\rho_2$(NEW) in actual use.

Then, it is checked if the control interval exceeds a period T(NEW) in 1445. If it does not exceed, the process returns to the step 1430. If it exceeds, the control characteristic value is calculated (1450). Specifically, the throughput and the average expansion rate shown in FIG. 9 are calculated. If these values have been on-line calculated by the moving average method, they may be used. Otherwise, the timer is reset to zero (1425) and the data during the period T(NEW) therefrom are stored and they may be used.

Then, the evaluation points $J_1$ and $J_2$ ($J_1 = J_2$) of the control characteristic are calculated from the table of FIG. 9 based on the calculated control characteristic values. Then, the code to be stored in the knowledge base is prepared. The vector $\vec{Y}$ prepared in 1410 of FIG. 14 is used as the vector of the condition field (510, 520 of FIG. 5) of the code to be stored. The evaluation point (530 in FIG. 5) is the value calculated above. The $r_1$ and $r_2$ of the territory function parameter (540 in FIG. 5) are those of the rule recalled in the step 1415 of FIG. 14. The parameter $\alpha$ is set to a small value if the evaluation point $J_1$ is small (the control characteristic is good) so that it is not forgot for a long period. If the evaluation points $J_1$ is large, the parameter $\alpha$ is set large so that it is forgot sooner. The parameter $\alpha$ may be determined by the following formula.

$$\alpha = \alpha_{min} + (\alpha_{max} - \alpha_{min}) J / J_{max}$$

where $\alpha_{min}$ and $\alpha_{max}$ are predetermined minimum value and maximum value of $\alpha$. The age $t$ is set to 0 for this new code.

The modified information $w_j(NEW)$, $T(NEW)$ and $\rho(NEW)$ are written into the control signal field (550 in FIG. 5).

In this manner, the code to be stored is prepared. According to this method, the detected status of the process unit and the computer when the code was recalled, the type of the control signal used and the performance evaluation point are stored.

The code is then stored in the knowledge base (1465). If a vacant space is present in the knowledge base (563, 564 in FIG. 5), the code is stored therein. If the vacant space is not present, the vector $\vec{Y}$ of the condition field of the code being stored is put in the territory functions $P_2$ of the existing codes (560, 561, 562 in FIG. 5) and the code having the largest function value is eliminated and the code to be stored is written there. If the value of $P_2$ in the $\vec{Y}$ is smaller than the evaluation point $J_1$ of the code to be stored in the knowledge base, the writing may be inhibited to prevent the code having a good characteristic from being eliminated rapidly.

The ages $\underline{t}$ of all codes in the knowledge base are incremented by one (1470) and the process returns to the step 1410. Since the status monitor index has been on-line prepared in the area SA in the step 1440, the knowledge base retrieving key may be prepared based on that index. In the same manner, the resource utilization policy instruction function 270 of FIG. 2 repeats the above operation so long as the computer system operates. In this manner, the content of the knowledge base 265 of FIG. 2 is gradually improved.

Figure 15:
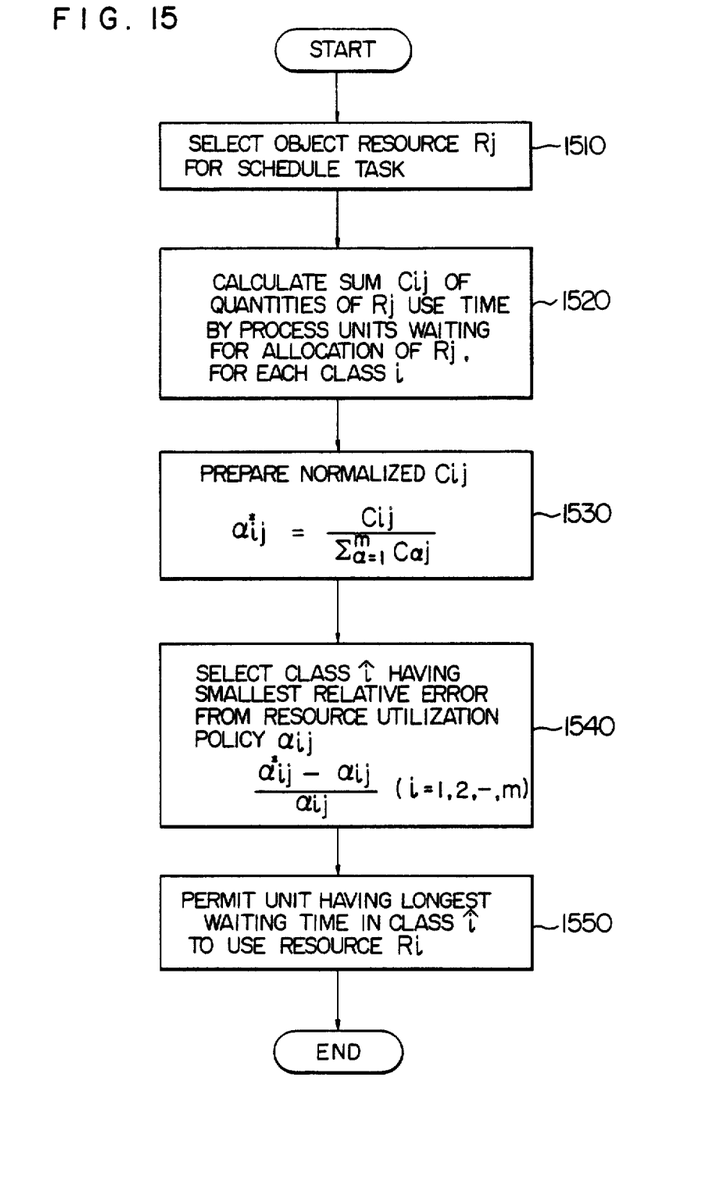
FIG. 15 is a flow chart for explaining an opertion of a low level scheduler in accordance with the present invention which acts under the policy of the learning resource manager.

FIG. 15 shows a flow chart for the content of 1435 of FIG. 14. It illustrates the operation of the scheduler 275 of FIG. 2.

First, the resource $R_j$ to be scheduled is selected from 230–240 of FIG. 2 (1510). As an example, if the resource $R_4$ was previously scheduled, the resource $R_5$ is selected this time. Let us assume that the resource $R_5$ is selected. A sum $C_{i5}$ ($i=1, 2, \ldots$ m) of the use time of the resource $R_5$ by the process units, for the classes 215–225 of FIG. 2 is determined (1520). It is normalized into $\alpha'^*_{i5}$(1530). Then, $\alpha'^*_{i5}$($i=1, 2, \ldots$ m) is compared with the column $R_5$ of the resource utilization policy matrix (1340 in FIG. 13, the content of which is shown in FIG. 4) prepared in 1420 of FIG. 14. The class i having a smallest relative error $(\alpha'^*_{i5} - \alpha_{i5})/\alpha_{i5}$ is selected (1540). The process unit in the class i having the longest waiting time is permitted to use the resource $R_5$ (1550) as a sort of service class.

While the present invention has been described in connection with the embodiment of a computer system, the concept of the autonomous resource management of the present invention can be applied to any system whether it is a concentrated system or a distributed system, such as a plant system, a computer control system, a plant FA (Factory Automation), a LA (Laboratory Automation) system or an OA (Office Automation) system.

As seen from the resource management of the computer system which is the typical case of the present invention as explained by the embodiment, the autonomous resource management function 260 of FIG. 2 automatically searches an optimum resource management policy in place of the system manager 130 in the prior art system shown in FIG. 1. Since it is an "self-improving system" unlike the conventional optimizing system, it can comply with any condition. Accordingly, the system resources become effectively utilized (the throughput is improved) and the benefit to the system users is improved (program execution time is shortened) under everlasting changes (variations in quantity and characteristic) in computer program mix which is the input to the computer system and various variations of the internal status of the computer system, so that the complex parameter optimizing task can be automated.

In the prior art, when the configuration of the system such as the computer is changed, for example, when the memory volume is changed, the parameters had to be reoptimized by human operators. The present invention eliminates the need for such reoptimization.

In the prior art, when the computer system is purchased and installed, it is necessary to analyze the nature of the business of the user and the nature of the processing program to establish the optimal resource management policy. The present invention eliminates the need for such laborious work.

As described hereinabove, the present system can be implemented in a very simple manner. In the prior art learning technique, the learning algorithm becomes complex. The present invention is superior in this respect.

We claim:

1. A resource management method for a computer system having resources and in which a plurality of process units compete for utilization of resources, a scheduler to control the resource utilization, a sensor to detect a system status including resource utilization status and a memory, the method to be performed during normal operation of the computer system without operator intervention comprising the steps of:

storing sets of control knowledge data in said memory, each set of control knowledge data including status data representative of a system status as detected by said sensor, control data for controlling said scheduler determined on the basis of said status data of the set and data representative of an effect of applying said control data of the set to said scheduler;

selecting one set of said control knowledge data whose status data substantially corresponds to current status data detected by said sensor to obtain an improved control data applying effect;

modifying control data contained in said selected set of control knowledge data and sending the modified control data to said scheduler;

detecting an effect of applying said modified control data to said scheduler for determining application effect data representative of an effect of applying said modified control data to said scheduler; and updating said stored control knowledge data on the basis of said current status data, the modified control data corresponding to said current status data and the application effect data resulting from applying said modified control data to said scheduler, whereby overall system performance for similar system status is improved with time.

2. A method according to claim 1, wherein said control data includes a planned utilization ratio of each respective resource for each of a plurality of categories of said process units.

3. A method according to claim 1, wherein said modification of the control data is made by use of random numbers.

4. A method according to claim 1, wherein said status data is represented by at least one of (a) a number of process units waiting to be processed by said system, (b) a trend of increase or decrease of said number of process units and (c) utilization factors of said resources.

5. A method according to claim 4, wherein said status data is represented by a variable average value of said number of process units, said trend of increase or decrease of said number of process units and said utilization factors of said resources.

6. A method according to claim 1, wherein said application effect data is expressed by a function of an average expansion rate of each process unit and a throughput of said system.

7. A method according to claim 6, wherein said application effect data is represented by a variable average value of detected values of said process unit average expansion rate and said throughput.

8. A method according to claim 6, wherein said application effect data is provided in the form of a lookup table.

9. A method according to claim 1, wherein said selection step includes a selection of one set of control knowledge data based on status data and application effect data of each set of control knowledge data and the detected status data.

10. A method according to claim 9, wherein selection of one set of control knowledge data is made by means of a retrieving function having an input variable which includes the detected current status data and a function value corresponding to said application effect data, said retrieving function being imparted with at least one of a plurality of characteristics including (1) an expected value of the application effect data which decreases as said detected current status data is more greatly spaced from the status data in the selected set of control knowledge data, (2) said expected value decreases as the value of said application effect decreases and (3) said expected value decreases each time said selected set of control knowledge data is updated.

11. A method according to claim 10, wherein said retrieving function is defined by a function:

$$P_1(\hat{Y}, Y, J_1, t, r_1, a) =$$

$$J_{max} - \left( J_{max} - \cfrac{J_{max}}{1 + \left(\cfrac{J_{max}}{J} - 1\right) \cdot \exp(-at)} \right) \cdot$$

$$\exp\{-A(r_1, \hat{Y} - Y)\}$$

where $\hat{Y}$: a vector of the current detected status data

Y: a vector of the status data of the set of control knowledge data $J_1$: said application effect data t: the number of updating of said set of control knowledge data $r_1$: a constant vector a: a constant $J_{max}$: a constant $A(r_1, \hat{Y}-Y)$: a distance function between two vectors $\hat{Y}$ and Y having a weight $r_1$.

12. A method according to claim 1, wherein said updating includes, if said area in said memory has a vacant space, storing a new set of control knowledge data in said vacant space and, if said area has no vacant space, at least one set of said control knowledge data is replaced by said new set of control knowledge data.

13. A method according to claim 12, wherein said replacing is carried out on a basis of a deletability factor of each set of control knowledge data.

14. A method according to claim 13, wherein said deletability is imparted with at least one of a plurality of characteristics including (1) an expected value of the deletability decreases as said current detected status data is more remote from the status data in the set of control knowledge data, (2) said expected value of the deletability increases as the value of said application effect data decreases and (3) said expected value increases each time said set of control knowledge data is updated.

15. A method according to claim 14, wherein said deletability is defined by a function:

$$P_2(\hat{Y}, Y, J_2, t, r_2, a) =$$

$$\left( \cfrac{J_{max}}{1 + \left(\cfrac{J_{max}}{J_2} - 1\right)\exp(-at)} \right) \exp\{-A(r_2, \hat{Y} - Y)\}$$

where $\hat{Y}$: a vector of the current detected status data

Y: a vector of the status data in the set of control knowledge data $J_2$: an application effect data t: the number of updatings of said set of control knowledge data $r_2$: a constant vector a: a constant $J_{max}$: a constant $(r_2, \hat{Y}-Y)$: a distance function between two vectors Y and $\hat{Y}$ having a weight $r_2$.

16. An autonomous resource management method for controlling the operation of a system in which a plurality of process units compete for resources in the system, said method being performed within said system without operator intervention and comprising the steps of:

storing in memory a knowledge base in the form of electrical codes containing information on a plurality of allocation policies for allocating said process units to said system resources and information as to an evaluation of each performance of said system operated under respective ones of said allocation policies, each allocation policy setting a different policy;

detecting the status of at least one of said process units and said system resources;

retrieving from said knowledge base an allocation policy in the form of an electrical code for executing said process units on the basis of said detected status;

modifying said retrieved allocation policy to generate a modified electrical code;

sending said modified electrical code indicating said modified allocation policy to said system;

allocating said process units to said resources in accordance with said modified electrical code indicating said modified allocation policy;

operating said system to execute said process units allocated to said resources and outputting, from said system, results of said execution in the form of electrical signals;

evaluating a performance of the system operated under the modified allocation policy on the basis of said results; and updating said knowledge base in memory by writing in said knowledge base said modified electrical codes representing said modified allocation policy and the evaluation of the performance corresponding to said modified allocation policy by deleting the electrical codes representing an inferior allocation policy from said knowledge base in memory.

17. An autonomous resource management method according to claim 16, wherein said electrical codes include information on the status of at least one of said system and said process units.

18. An autonomous resource management method according to claim 16, wherein said system is a multiprogramming computer system.

19. An autonomous resource management method according to claim 16, wherein said information in said knowledge base is expressed in the form of electrical codes representing process unit status, computer status, evaluation point data, territory function parameter data and control signal data.

20. An autonomous resource management method according to claim 16, wherein said updating step includes a step for replacing electrical codes representing an inferior allocation policy and an evaluation corresponding to said inferior allocation policy in said knowledge base by electrical codes representing said modified allocation policy and said evaluation corresponding to said modified allocation policy.

21. An autonomous resource management method according to claim 20, wherein said replacing of said inferior allocation policy and the evaluation corresponding to said inferior allocation policy is determined on the basis of another criterion such that an allocation policy having a difference from said another criterion greater than other allocation policies as determined from said detected status is less likely to be substituted.

22. An autonomous resource management method according to claim 21, wherein said criterion is defined by a function, the variables of which include at least ages representative of time periods during which candidate inferior allocation policies being considered have been held in said knowledge base, evaluations of the candidate inferior allocation policy and the gap between said detected status and the status of said candidate inferior allocation policies.

23. An autonomous resource management method according to claim 16, wherein said retrieved allocation policy is determined on the basis of criterion such that an allocation policy having a difference from said criterion greater than other allocation policies as determined from said detected status is more unlikely to be recalled from said knowledge base.

24. An autonomous resource management method according to claim 23, wherein said criterion is defined by a function including variables, the variables of said function including ages representative of time periods during which said electrical codes representing said allocation policies are held in said knowledge base in memory, evaluations of said allocation policies and the age between said detected status and the status of candidate allocation policies.

25. An autonomous resource management method according to claim 23, wherein said criterion includes as parameters thereof ages representative of a time period during which said electrical codes representing said allocation policies are held in said knowledge base in memory so that an older allocation policy is more unlikely to be recalled and more likely to be eliminated from said knowledge base in memory.

26. An autonomous resource management method according to claim 23, wherein the degree of the unlikelihood of an allocation policy in said knowledge base being recalled is modifiable.

27. An autonomous resource management method according to claim 16, wherein said allocation policy to be modified includes electrical codes representing a resource utilization matrix function.

28. An autonomous resource management method according to claim 27, wherein said allocation policy includes electrical codes representing a control time and a parameter for monitoring the status of a computer.

* * * * *